United States Patent
Chopra et al.

(10) Patent No.: US 10,289,441 B1
(45) Date of Patent: May 14, 2019

(54) INTELLIGENT SCALE-OUT FEDERATED RESTORE

(71) Applicant: EMC IP Holding Company LLC, Hopkinton, MA (US)

(72) Inventors: Shelesh Chopra, Bangalore (IN); Sunil Yadav, Bangalore (IN); Amarendra Behera, Bangalore (IN); Hareej G Hebbur, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 15/796,455

(22) Filed: Oct. 27, 2017

(51) Int. Cl.
*G06F 9/455* (2018.01)
*G06F 9/50* (2006.01)

(52) U.S. Cl.
CPC .......... *G06F 9/45558* (2013.01); *G06F 9/505* (2013.01); *G06F 9/5077* (2013.01); *G06F 2009/4557* (2013.01); *G06F 2009/45575* (2013.01); *G06F 2009/45591* (2013.01)

(58) Field of Classification Search
CPC .................................................. G06F 9/45558
See application file for complete search history.

(56) References Cited

U.S. PATENT DOCUMENTS 8,069,237 B2 * 11/2011 Yoshida ............ H04L 29/12113
709/203
9,537,708 B2 * 1/2017 Mouquet ........... H04L 29/12066

* cited by examiner

*Primary Examiner* — Charlie Sun
(74) *Attorney, Agent, or Firm* — Staniford Tomita LLP

(57) ABSTRACT

A request is received to restore a set of virtual machines (VMs) to a cluster of nodes. The nodes are profiled to collect, for each node, a current load and health status. A participating node list is generated by excluding from the list any node having a current load that exceeds a threshold or having a health status of unavailable. For each participating node, a determination is made of a recommended number of VMs to assign to a node based on a current load of the node. A participating node and VM to restore is selected. The selected VM is assigned to the selected participating node. The selection and assignment is repeated until each participating node has been assigned its respective number of VMs to restore or all VMs to restore have been assigned. The participating nodes are instructed to begin restoring their assigned VMs.

18 Claims, 9 Drawing Sheets

INTELLIGENT SCALE-OUT FEDERATED RESTORE

TECHNICAL FIELD

Embodiments are generally directed to networked-based data protection methods, and more specifically to performing restorations in a large-scale cluster environment.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

A cluster refers to a collection of servers, typically referred to as nodes, that communicate with each other to make a set of services highly available to clients. A cluster architecture may be used with large-scale applications including, for example, database servers, messaging servers, email applications, collaboration platforms, and so forth. Virtual machines are also often deployed across the nodes of a cluster. Many enterprises use virtual machines to help process data and provide services.

It is important that the cluster be backed up so that the cluster can be recovered in cases of data corruption, equipment failure, disasters, catastrophes, and so forth. A problem with restoring the cluster, however, is the inability to balance the restoration across the cluster. For example, when restoring a set of virtual machines from backup to the cluster, there is very little visibility into exactly which node of the cluster will be hosting the virtual machines after the restoration is complete.

In some cases, the node to which the virtual machines are restored to does not have sufficient resources to support all the restored virtual machines. For example, the node may already be hosting a large number of existing virtual machines, may lack the appropriate amount of memory resources, compute resources, network resources, and so forth that may be required to properly run all of the virtual machines. As a result, there can be a resource crunch or over-utilization of resources of the node. This can lead to a degradation in performance, increased response times, and so forth. There is a need for improved systems and techniques for restoring to a cluster.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
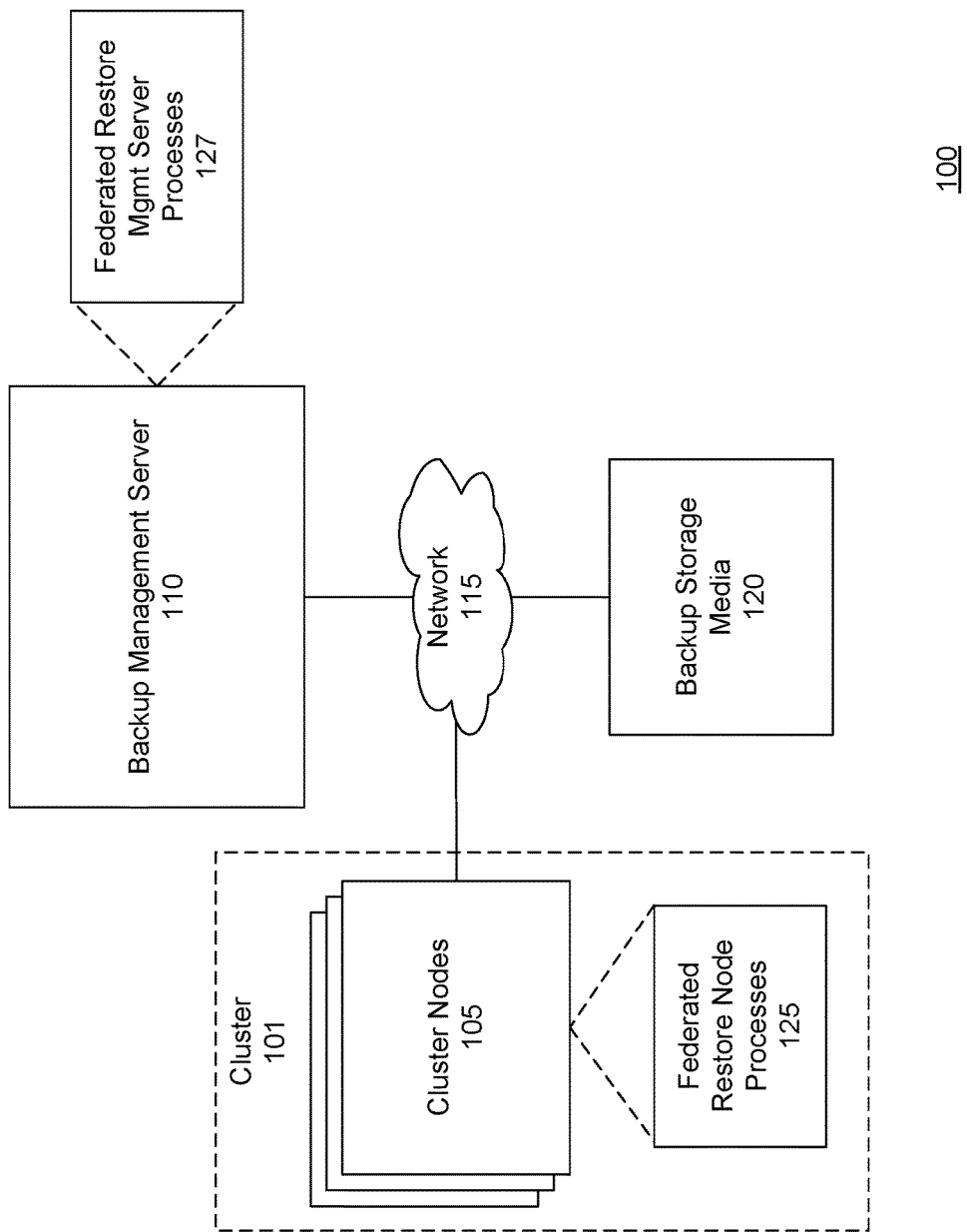
FIG. 1 shows a block diagram of a large-scale network implementing a federated restore process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for a federated restore of backed up applications and other data from secondary backup storage to a cluster of nodes. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for data protection in a large-scale cluster environment. This environment may host any type of large or distributed application such as Microsoft Hyper-V, Microsoft Exchange, SQL Server, IBM Notes, and so forth. In a specific embodiment, the environment may include a large number of virtual machines (VMs) to be restored from backup to the cluster. There can be tens, hundreds, or even many thousands of virtual machines. For example, there may be 50, 100, 500, 1,000, 5,000, or more than 5,000 VMs. It should be appreciated that while some embodiments are shown and described in conjunction with restoring virtual machines, such as Hyper-V virtual machines, the systems and techniques can be applied to restoring any type of big data clustered application running on cluster shared volumes such as Exchange, SQL, and others.

In system 100 there is a cluster 101 including multiple nodes 105 in which data that has been backed up from the cluster is to be restored to the cluster. A node may be referred to as a host. A network or backup management server computer 110 is coupled directly or indirectly to these nodes through a network 115, which may be a cloud network, LAN, WAN or other appropriate network. Network 115 provides connectivity to the various systems, components, and resources of system 100, and may be implemented using protocols such as Transmission Control Protocol (TCP) and/or Internet Protocol (IP), well-known in the relevant arts. In a distributed network environment, network 115 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup storage media 120. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 110 and cluster 101 having one or more nodes or hosts 105. Applications and other data of the nodes have been backed up (e.g., copied) to backup media 120 and are to be restored (e.g., copied back) to the cluster. In an embodiment, one or more nodes of the cluster execute node processes 125 for a federated restore and the backup management server executes corresponding management processes 127 for the federated restore.

The backup management server can provide a management console through which a user, such as a backup administrator, may configure the backup system, initiate and request restores, monitor the restore operations, set restore options (e.g., configure federated restore options), designate specific nodes as being restore proxies, and so forth. For example, the management console may present the user with a graphical user interface (GUI) that is displayed on an electronic screen. Instead or additionally, there can be a programmatic interface such as an application programming interface (API).

In an embodiment, system 100 may represent a Data Domain Restorer (DDR)-based deduplication storage system, and a storage server having backup media 120 may be implemented as a DDR Deduplication Storage server provided by Dell EMC. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by Dell EMC. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
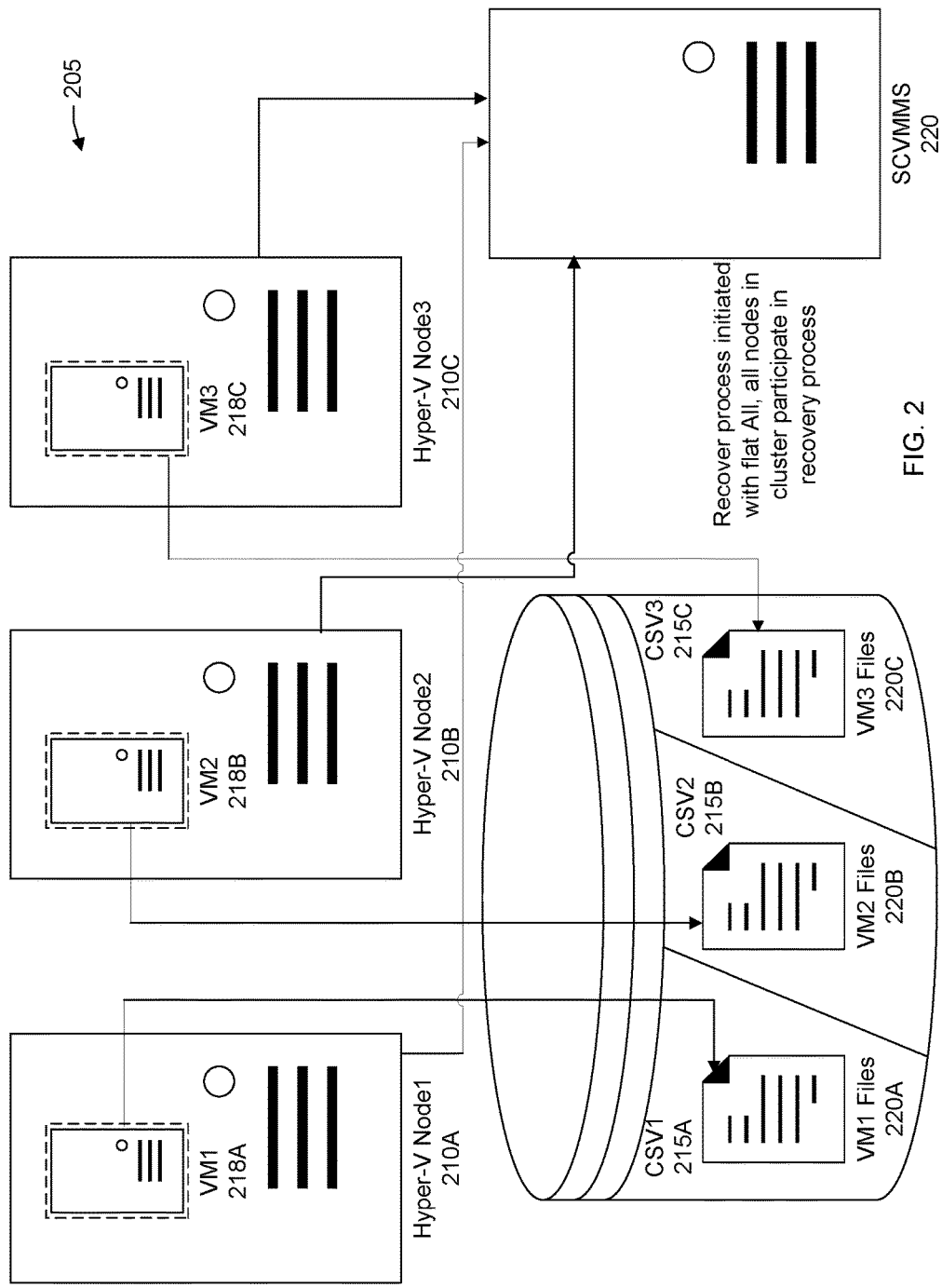
FIG. 2 shows a block diagram of a system for federated restores of virtual machines to a cluster, according to a specific embodiment.

FIG. 2 shows a block diagram of a system to perform intelligent and scalable federated restores of virtual machines according to a specific embodiment. The example shown in FIG. 2 includes a cluster 205 of nodes 210A-210C, cluster shared volumes (CSV) 215A-C, and management server 220, each of which are interconnected by a network. Virtual machines 218A-C are hosted by nodes 210A-C, respectively.

As discussed above, the nodes may communicate with each over a LAN and may further be connected to a shared storage system via a SAN. In the example shown in FIG. 2, the shared storage system includes a cluster shared volume (CSV).

A cluster shared volume can include a set of hard disk drives logically grouped to expose a volume to which read operations, write operations, or both may be issued by one or more nodes of the cluster environment. The cluster shared volume may include a file system for organizing the data. Examples of file system formats include NTFS (New Technology File System), Resilient File System (ReFS), and others.

Virtual hard drives 220A-C have been allocated to CSVs 215A-C, respectively. In an embodiment, a virtual hard disk drive is formatted in the VHD or VHDX (Virtual Hard Disk) file format as provided by Microsoft. The VHD/VHDx format is a container format, which can contain disk related information (e.g., files and folders). VHD/VHDx files can be mounted and used as a regular disk. Volumes such as NTFS/ReFS/FAT32 or any file system which the OS supports on the mounted disk can also be created.

In an embodiment, the virtual hard disk is used as the hard disk of a virtual machine. In other words, VMs 218A-C may read data from and write data to virtual hard drives 220A-C, respectively. In the example show in FIG. 2, the cluster includes three nodes, a virtual machine hosted by each of the three nodes, and three virtual hard drives. It should be appreciated, however, that the cluster may include any number of nodes, virtual machines, and virtual hard drives. In other words, a node in the cluster may host or run any number of virtual machines. A node may host multiple virtual machines (e.g., two or more virtual machines). For example, a node may host 10, 20, 30, 40, 50, 100, 150, 200, 250, 500, or more than 500 VMs. A virtual machine can read data on a cluster shared volume, write data to a cluster shared volume, or both.

In a specific embodiment, a cluster shared volume is as provided by Windows Server from Microsoft. In this specific embodiment, a cluster shared volume is a shared disk having, for example, an NTFS or ReFS volume, that is made accessible for read and write operations by all nodes within the cluster. The cluster may be referred to as a Windows Server Failover Cluster.

A cluster shared volume enables a virtual machine (VM) mobility throughout the cluster as any node can access the VHD files on the shared volume. Cluster shared volumes can simplify storage management by allowing large numbers of VMs to be accessed off a common shared disk. CSV also increases the resiliency of the cluster by having I/O fault detection and recovery over alternate communication paths between the nodes in the cluster. In other words, the cluster of nodes can include failover clustering services provided by an operating system for the cluster to achieve high availability.

In this specific embodiment, a virtual machine to be restored includes a Hyper-V virtual machine. Hyper-V is a virtualization platform provided by Microsoft of Redmond, Wash. The Hyper-V VM is configured and the associated virtual hard disk(s) are created on or copied to a cluster shared volume disk. Multiple VHDs can be placed on a CSV that in turn are associated with multiple VMs which can be running on different nodes in the cluster. Multiple (e.g., two or more) nodes can access the same disk simultaneously, concurrently, or in parallel.

The management server is responsible for managing backup operations and restoration operations for the cluster. Backup and recovery challenges are becoming more and more complex while service level agreements (SLAs) are becoming even more and more demanding. A problem with restoring VMs in a large clustered environment, such as a Hyper-V Server environment, is that it is difficult to predict the node to which the VMs will be restored. It can appear that the VMs are being restored to a random node in the large cluster. This makes it very difficult for a user or backup administrator to track where the VM is hosted post restore. Further, due to the seemingly random election of nodes to host a VM post restore, the restored VMs often result in crunching resources on that node to which they have been restored. A resource crunch can occur when there is an over-utilization of resources on the node. An over-use of resources can increase latency, response times, and degrade overall performance.

In a specific embodiment, systems and techniques are provided to make the Hyper-V federated restore operation more intelligent and real-time. The proxy node restore concept has some inherent limitations. One limitation is the hosting of a VM on any node in the cluster is without user awareness. As discussed, this is a major drawback during restore operations. It would be desirable to provide an intelligent restore and, more particularly, an architecture that supports scale out federating the load during restore; batch restore; scale out at all nodes or user choice; a load balanced restore; intelligent failover (e.g., automatic switch if nodes goes down or come back); and integration with other management modules, such as System Center Virtual Machine Management (SCVMM) as provided by Microsoft, to show the queue of VMs to be restored and the node as to where the next VM will be restored on.

Conventional systems include a cluster owner node which takes the primary restore job. However there are several limitations. First, it is not scaled as you are leveraging only one of the node during restore. Second, if there is a resource crunch on that node, a recovered VM will not come up. There is no optimization of the restore based on the availability and health of the nodes. In a specific embodiment, systems and techniques allow these configurations to be dynamic.

Benefits of the system include: 1) Support for batch restores of VMs in a cluster environment; 2) Scale out to all nodes or user choice of nodes to run recovery; 3) Load-balanced of all the restore operations; 4) Intelligent failover (e.g., automatic switch if nodes goes down or come back); 5) Integration with SCVMM to also show the queue (e.g., where will next VM be restored on); and 6) Improved performance of restore operation on the dedicated nodes (list of nodes supplied by user) and then migration of the VMs to intelligently chosen nodes to load balance the cluster. In an embodiment, dedicated nodes for restore operation do not impact the production servers. These can be the nodes where CPU and IOs happen.

In an embodiment, each node owns a restore job of one or more VMs and will be responsible for bring up those respective VMs. The user may pass a single parameter (e.g., Restore_Federated=All). Once this is set, the system generates a map of the node to VM and each node starts a restore operation for their respective VM onto storage. The user can also continue to select one or more proxies by selection (e.g., Restore_Federated=node2; node3; and so forth). If this is not set, then recovery will flow through using the intelligent selection of one or more nodes of the cluster. That is, the system will find the best possible node or a good node for hosting restored VMs by checking the node resources including current compute or central processing unit (CPU) usage, memory usage, network usage, or combinations of these, and mapping each VM against them.

For example, in an embodiment, the nodes having fewer numbers of healthy VMs running and having sufficient resources in them would be preferred to start the recovery. In the case of multiple nodes having a good configuration, a round robin algorithm may be applied. Table A below shows an example of a mapping table that may be created during a restore operation by profiling the Hyper-V environment.

TABLE A

| VM Name | Cluster node owner VM during backup | Cluster node owning VM post restore |
|---------|-------------------------------------|-------------------------------------|
| VM1     | node_1                              | node_1                              |
| VM2     | node_1                              | node_2                              |
| VM3     | node_1                              | node_3                              |
| VM4     | node_2                              | node_1                              |
| VM5     | node_2                              | node_2                              |
| VM6     | node_2                              | node_3                              |

As shown in the example of table A above, a VM may be restored to the same or different node from which it was backed up.

Figure 3:
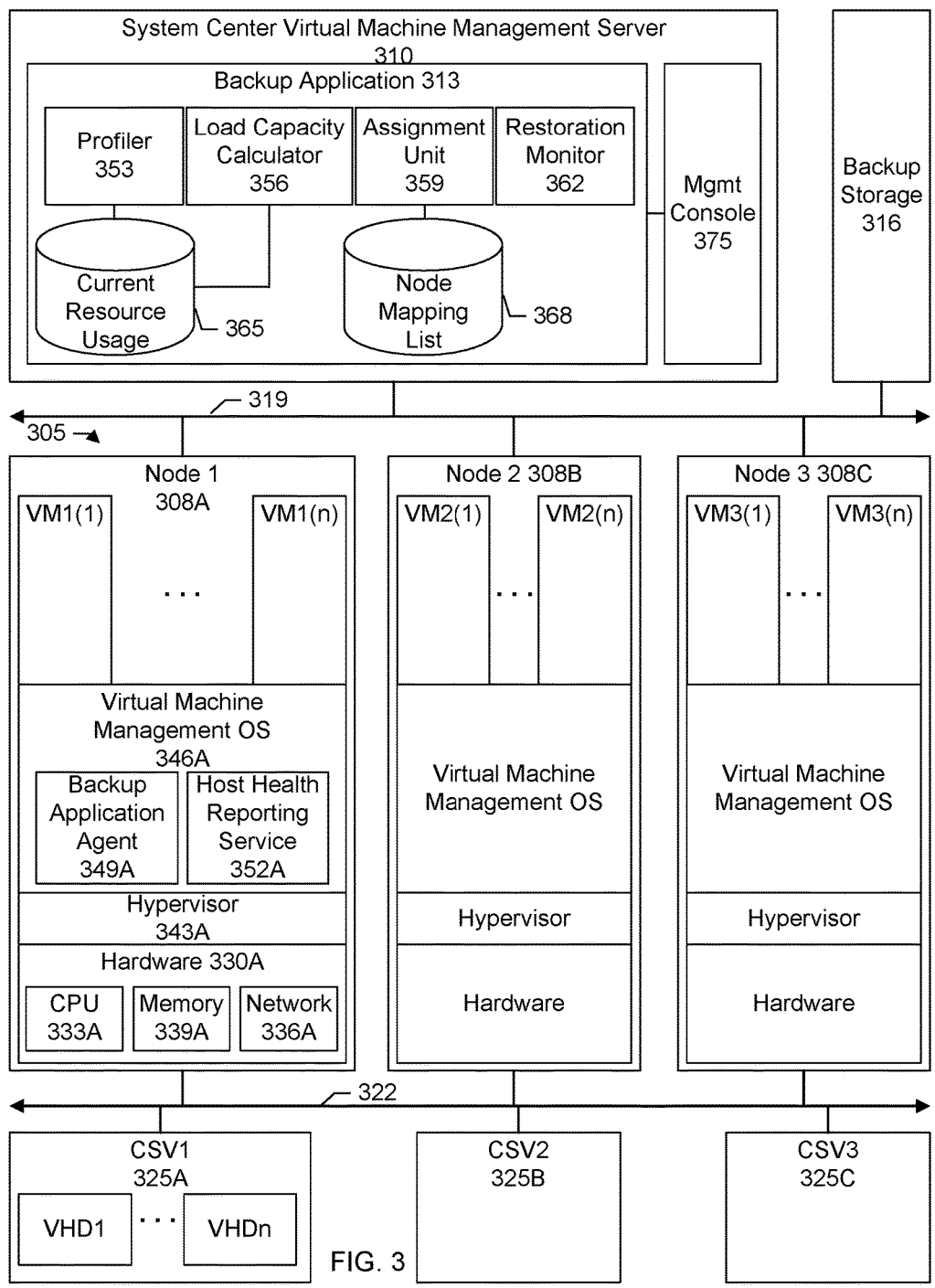
FIG. 3 shows another block diagram of a system for federated restores of virtual machines to a cluster, according to a specific embodiment.

FIG. 3 shows a more detailed block diagram of an environment having a system for intelligent federated restore operations of virtual machines. This environment includes a cluster 305 having any number of nodes (e.g., nodes 308A-C), a system center virtual machine management center 310 having a backup application 313, and backup storage 316 storing a backup of the virtual machines. The nodes may be interconnected with each other through a network such as a local area network (LAN) 319. The nodes are further connected via a storage area network (SAN) 322 to any number of cluster shared volumes (e.g., CSVs 325A-C). Examples of SAN protocols that may be used by the nodes to access the cluster shared volumes include iSCSI, Fiber Channel Protocol (FCP), Fiber Channel over IP (FCIP), Fibre Channel over Ethernet (FCoE), and others.

The backup application is responsible for restoring backed up virtual machines from backup storage to the cluster of nodes. A node in the distributed environment, such as node 308A, can be a general purpose computer with software and hardware resources. For example, resource hardware 330A may include a processor 333A, storage, input/output (I/O) controller, network 336A, and memory 339A each of which may be interconnected by a bus architecture or any interconnection scheme. A node can use virtualization software to host and run the virtual machines (e.g., VM1(1)-VM1(n) on first node 308A).

Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform. Thus, a virtual machine may include a guest operating system, guest applications running on the guest operating system, and virtual hardware which represents a hardware state of the virtual machine. Each virtual machine may be assigned an identifier such as an Internet Protocol (IP) address, globally unique identifier (GUID), or both.

In a specific embodiment, the virtualization software includes a hypervisor 343A and a virtual machine management operating system (OS) 346A. In this specific embodiment, the virtualization software or platform includes Hyper-V from Microsoft Corporation of Redmond, Wash. It should be appreciated that while some embodiments are shown and described in conjunction with Hyper-V, aspects and principles of the system can be applicable to other virtualization platforms and services and other large-scale applications.

In this specific embodiment, the hypervisor is a thin layer of software between the hardware and virtual machines. The virtual machine environment may utilize the hypervisor to create and run the virtual machines. The hypervisor is responsible for ensuring partition isolation and managing memory. The virtual machine management OS may be located in a specialized partition referred to as the parent partition and may include the virtualization stack and hardware specific device drivers. Virtual machines hosted by the node are in guest partitions and may access the parent partition for their device access. A computer running the hypervisor may be referred to as a host machine and all virtual machines may be referred to as guest machines which may run guest operating systems (OS). The hypervisor provides the guest operating systems with a virtual operating platform and manages the execution of the VMs.

As shown in the example of FIG. 3, each node includes backup application module or agent 349A. In a specific embodiment, the backup module is configured to operate with the Hyper-V hypervisor. This hypervisor is a native hypervisor that creates VMs on Intel x86-64 based systems and is part of the Microsoft Windows server products. In this specific embodiment, the backup module may be referred to the Networker Module for Microsoft (NMM) as provided by Dell EMC.

In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

In an embodiment, the backup application agent, at the direction of the backup application server program, communicates with host health reporting service 352A to collect resource usage details or metrics indicating the current loading on the resources of the node. For example, a node may be hosting one or more existing virtual machines, be providing existing services, performing existing tasks, and so forth. These existing virtual machines, tasks, and processes consume computing resources of the node.

In an embodiment, there are three types of resource usage details that may be collected including memory usage, compute or CPU usage, and network usage. CPU usage may refer to a measurement of the amount of compute capacity of a node that is being consumed. Memory usage may refer to a measurement of the amount of random access memory (RAM) of the node that is being consumed. Network usage may refer to a measurement of the amount of data sent and received by the network interfaces of the node.

The backup application server program includes several components or modules including a profiler 353, load capacity calculation unit 356, assignment unit 359, restoration monitor 362, storage (e.g., databases) 365 and 368, that store current resource usage metrics of the nodes, and a node mapping list, respectively. It should be appreciated that the components and modules shown in FIG. 3 can be functional entities. Thus, there can be many different hardware and software configurations that may be used to implement the desired functions.

The profiler is responsible collecting current loading metrics for each of the various nodes in the cluster. The collected loading metrics may be stored in current resource usage database 365. In an embodiment, the profiler may communicate directly with each of the various nodes. In another embodiment, there can be a cluster management server that the profiler communicates with to obtain current loading metrics of the nodes being managed by the cluster management server. As discussed, in an embodiment, the current loading details include current memory usage, current CPU usage, and current network usage.

The load capacity calculation unit is responsible for calculating a recommended number of VMs that a node may be assigned to restore. The recommended number of VMs indicates the maximum number of VMs that may be assigned to a node without overloading the resources on the node. In an embodiment, the calculation is a function of the current memory, CPU, and network usage of a particular node. Thus, some nodes in the cluster may be capable of hosting a greater or fewer number of virtual machines to restore as compared to other nodes in the cluster depending upon the current loading of resources on a particular node.

The assignment unit is responsible for assigning the various virtual machines to restore to the various nodes in the cluster. The assignment unit generates a node mapping list that identifies the virtual machines to be restored and the corresponding nodes that have been assigned ownership of particular virtual machines to restore. The assignment unit receives as input the recommended number of virtual machines that each node may restore without being overloaded. The assignment unit includes logic to help ensure that the restoration jobs are distributed in accordance with each particular node's recommended number of virtual machines to restore so that the work and loading is balanced across the cluster.

The restoration monitor is responsible for monitoring the progress of the restoration process. This includes, for example, monitoring resource usage (e.g., memory, CPU, and network) of a node during the restore operations. If, for example, the restoration monitor discovers during the restoration process that one node is being over-utilized while another node is under-utilized, the restoration monitor may shift some of the work from the over-utilized node to the under-utilized node. For example, a virtual machine that was initially assigned to the over-utilized node to restore may be reassigned to the under-utilized node to restore.

In an embodiment, the backup application server program interfaces with a management console 375 of the system center virtual machine management server to report on the progress of the restoration. The management console may serve as an interface to the backup application so that the user can see details of the restoration and configure restoration options. The management console may display information such as identifications of the nodes and virtual machines a particular node has been assigned to restore, a number of virtual machines of a node that have been restored, a remaining number of virtual machines of the node that have yet to be restored, time estimates for the restoration operation, and the like.

Figure 4:
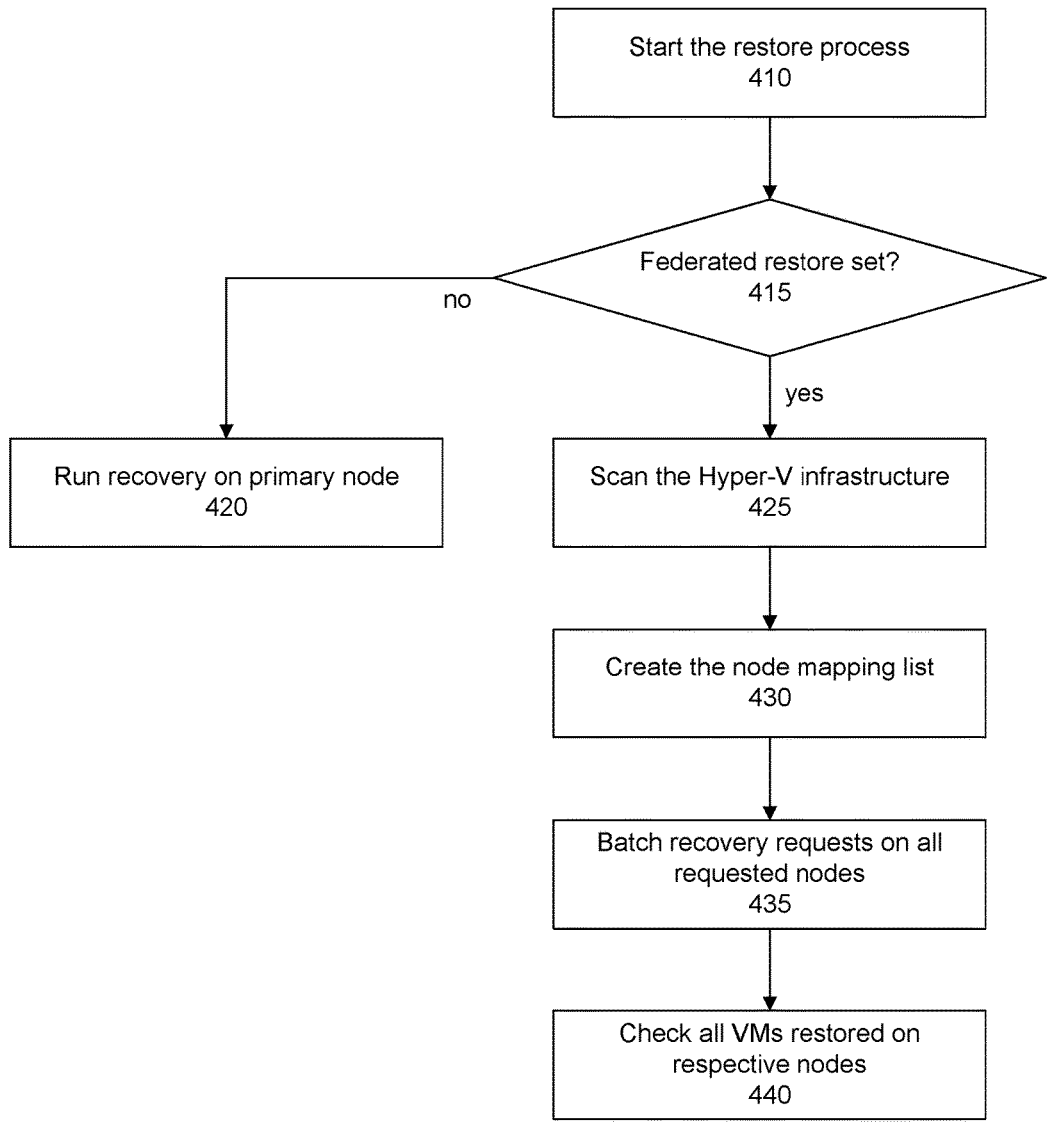
FIG. 4 shows an overall flow of a process for federated restores of virtual machines to a cluster, according to a specific embodiment.

FIG. 4 shows an overall flow of a federated restoration process according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a restore process is started. For example, a backup administrator may use the management console to select a particular backup of a set of virtual machines to restore.

In a step 415, the backup application examines whether or not an option for federated restore has been set. In an embodiment, the system provides backup administrators with the flexibility to decide whether or not they would like federated restores. If the federated restore option has not been selected, the backup application proceeds to restore the virtual machines according to a legacy recovery flow (step 420).

Alternatively, if the federated restore option has been selected, in a step 425, the backup application proceeds to scan the cluster infrastructure (e.g., Hyper-V infrastructure) to collect current resource loading information of the nodes in the cluster. In a step 430, the node mapping list is created.

Thus, in an embodiment, the status of the various nodes is captured before the restore starts. Table B below shows an example of some of the information that may be collected during the scanning of the cluster and some sample data for the recommended number of VMs that may be queued for each node.

TABLE B

| Node | NodeID | CPU | Memory | Current State | Recommended number of VMs that can be queued |
|---|---|---|---|---|---|
| hostname1 | xxx-1111 | Dual Core | 8 GB | healthy | 20 |
| hostname2 | xxx-2222 | Quad Core | 16 GB | healthy | 40 |
| hostname3 | xxx-3333 | Quad Core | 32 GB | healthy | 60 |
| hostname4 | xxx-4444 | Single Core | 4 GB | unavailable | 10 |
| hostname5 | xxx-5555 | Single Core | 4 GB | healthy | 10 |

Capturing these details of the nodes facilitates picking the appropriate nodes and optimizing the restoration loads based on the availability of the node as well as the capacity of the node.

In a step 430, a node mapping list is created. Table C below shows an example of a node mapping list that may be created based on the number and capacity of the nodes.

TABLE C

| VMs | Node |
|---|---|
| VM1-VM20 | xxx-1111 |
| VM21-VM60 | xxx-2222 |
| VM61-VM120 | xxx-3333 |
| VM120-VM130 | xxx-5555 |

In an embodiment, once the actual restore process starts, the listing of nodes participating in the restore is determined. In this example, the host identified as hostname4 (nodeID xxx-4444) is excluded as it is listed as unavailable.

In a step 435, batch recovery requests are started on all nodes requested to participate in the recovery. In a specific embodiment, restorations of the VMs occur in parallel, concurrently, or simultaneously. For example, a first node may be assigned a first VM to restore. A second node may be assigned a second VM to restore. While the first node is restoring the first VM, the second node may be restoring the second VM. A VM restoration job on the first node may be spawned currently with a VM restoration job on the second node.

In a step 440, the system performs a check of all VMs that have been restored on the respective nodes. For example, once a VM has been restored to a node, the backup application agent on the node may instruct the VM to start or power-up. The agent may then report back to the management server on the success (or failure) of the restoration process.

Table C above shows the initial mapping of VMs to restore to the assigned nodes. In an embodiment, if a restore at a particular node is completed early, the system redistributes the load from one or more other nodes if it is efficient to do so.

In a specific embodiment, there can be a preference for restoring a virtual machine to a node from which the virtual machine was backed up. In this specific embodiment, during the assignment process, an initial attempt is made to assign the virtual machines to be restored to the particular nodes from which they were backed up from. If a particular node is unavailable or has already been assigned its recommended number of virtual machines to restore, other nodes in the cluster may be considered.

Figure 5:
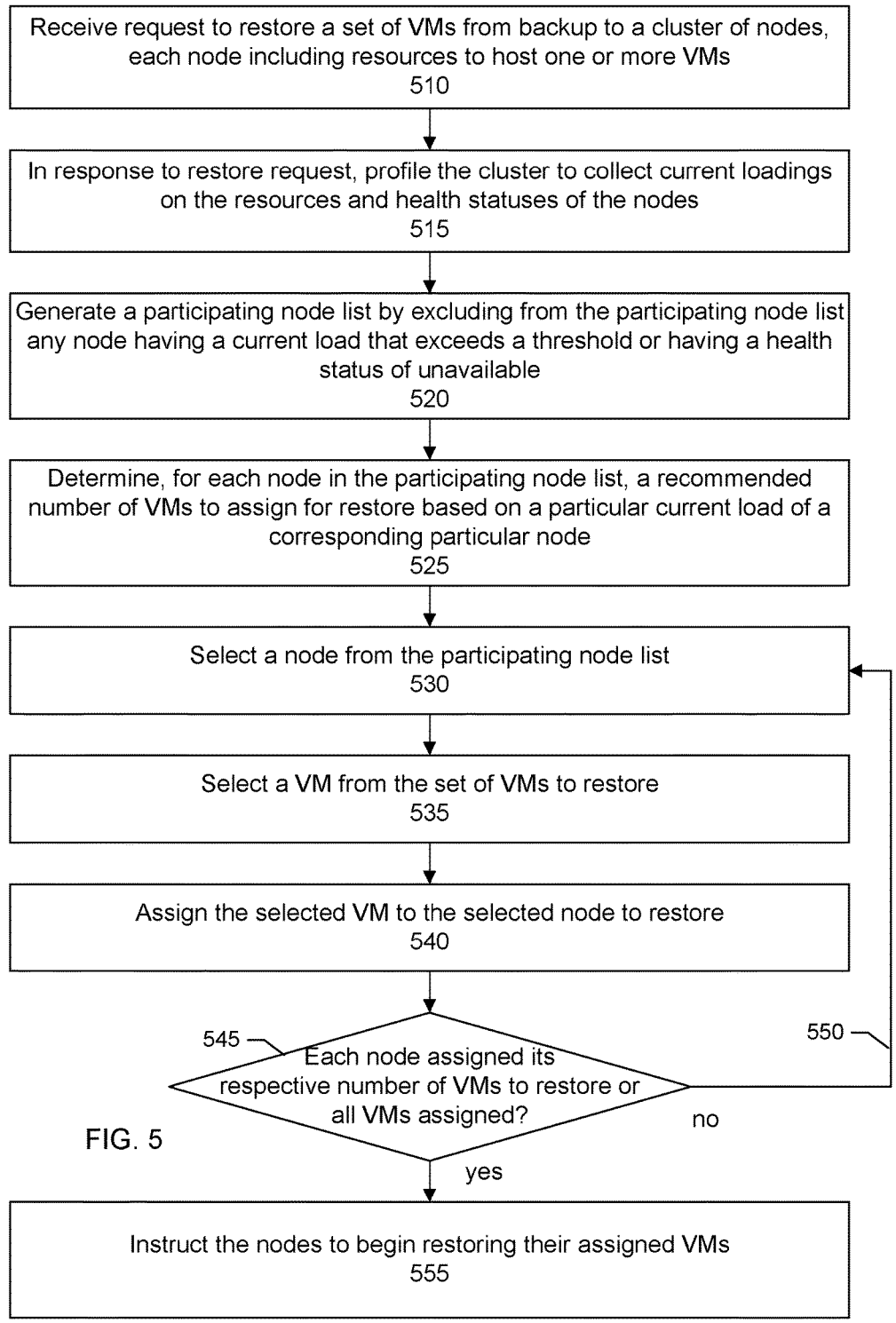
FIG. 5 shows another flow of a process for federated restores of virtual machines to a cluster, according to a specific embodiment.

FIG. 5 shows further detail of another flow for a federated restore of virtual machines to a cluster of nodes. In a step 510, a request is received to restore a set of VMs from backup to a cluster of nodes, each node including resources to host one or more VMs. In a step 515, in response to the request, the cluster is profiled, polled, or interrogated to collect current loadings on the resources and health statuses of the nodes at the point-in-time that the restore has been requested. The profiling may include pinging each node of the cluster to determine availability. If, for example, a node does not respond or respond within a certain period of time, the node may be flagged as unavailable. The profiling may include issuing a request to each node of the cluster to report current loading or resource usage including current memory usage, current CPU usage, current network usage, health status, number of existing active VMs being hosted on the node, or combinations of these.

The nodes report to the backup server manager their respective loadings and the received loading information may be stored in a database. Table D below shows an example of resource loading information that may be collected.

TABLE D

| Node | Memory Usage | CPU Usage | Network Usage | Health Status |
|---|---|---|---|---|
| Node A | 17% | 22% | 11% | available |
| Node B | 33% | 42% | 18% | available |
| Node C | 80% | 72% | 68% | available |
| Node D | 11% | 16% | 8% | available |
| Node E | — | — | — | unavailable |
| ... | ... | ... | ... | ... |

In a step 520, a participating node list is generated by excluding from the participating node list any node having a current load that exceeds a threshold or having a health status indicating that the node is unavailable. In a specific embodiment, the system stores set of predefined threshold values for memory, CPU, and network usage. A current usage or loading as reported by a node is compared to the threshold values. If any of the resource usage parameters are above or exceed the corresponding thresholds, the node may be excluded, omitted, or not included in the participating node list.

As an example, consider that a threshold for memory usage is 75%, a threshold for CPU usage is 80%, and a threshold for network usage is 85%. According to the current loading data in table D above, node C may be excluded from the participating node list. Current CPU usage for node C is 72% which is below the threshold CPU usage of 80%. Current network usage for node C is 68% which is below the threshold network usage of 85%. Current memory usage for node C, however, is 80% which exceeds or is above the threshold memory usage of 75%. Thus, even though node C has reported that it is available, node C may be excluded from the participating node list due to the current loading on the resources provisioned to node C. Node C, for example, may currently be hosting a large number of existing and active virtual machines that are busy processing other tasks and providing other services.

As another example, node E is likewise excluded from the participating node list because the health status of node E is indicated as unavailable. For example, node E may have failed to properly respond to a request for current loading information issued by the backup application server manager because the node was offline or otherwise occupied with processing other tasks.

Nodes A, B, and D, however, may be included in the participating node list because their current usage metrics for memory, CPU, and network are below the respective threshold levels. These threshold levels may be user-configurable. This allows each individual administrator to customize and tune the system to the particular needs and resources of their respective enterprise.

Table E below shows an example of the participating node list.

TABLE E

| Participating node list |
|---|
| Node A |
| Node B |
| Node D |

In a step 525, a recommended number of virtual machines to assign to a node for restore based on a corresponding current load on the node is determined for each node listed in the participating node list. The determination is made by analyzing the current loading of memory, CPU, and network resources of the node. In a specific embodiment, a remaining load capacity of a node is calculated. The remaining load capacity may be a composite value that is calculated as a function of current memory, CPU, and network usage. In a specific embodiment, weighted values may be assigned to each resource parameter to reflect the relative importance of the resource in regards to processing restorations of VMs. Specifically, having sufficient memory can be the most important factor, followed by CPU, and then followed by network.

Below is an example of a formula or algorithm for calculating remaining load capacity of a node.

Remaining load capacity=(A×1/current memory usage)+(B×1/current CPU usage)+(C×1/current network usage).

"A" represents a first weighted value that corresponds to memory usage. "B" represents a second weighted value that corresponds to CPU usage. "C" represents a third weighted value that corresponds to network usage. The weighted values may be different from each other. In an embodiment, the first weighted value is greater than the second and third weighted values to indicate the greater importance of memory relative to CPU and network usage. The second weighted value is greater than the third weighted value to indicate the greater importance of CPU relative to network.

Thus, consider, as an example, that a current loading for a node includes first, second, and third measurements. The first measurement indicates current memory usage of the node. The second measurement indicates current CPU usage of the node. The third measurement indicates current network usage of the node. A remaining load capacity of the node may be calculated by multiplying a first weighted value and an inverse of the first measurement, multiplying a second weighted value and an inverse of the second measurement, multiplying a third weighted value and an inverse of the third measurement, and summing or adding the resulting products, where the first weighted value is greater than the second and third weighted values, and the second weighted value is greater than the third weighted value.

In an embodiment, these weighted values are configurable so that an administrator may determine the relative degree of importance of one specific resource parameter relative to other resource parameters. It should be appreciated that an algorithm to calculate a value or other index that indicates the remaining or available capacity of a node may instead or additionally include other mathematical operations (e.g., calculating averages, ratios, means, medians, standard deviations), resource parameters, or combinations of these.

In a specific embodiment, a virtual machine may be assigned a load demand value. The load demand value can indicate the degree of memory, CPU, and network resources that may be consumed or required to restore a virtual machine on a node. The recommended number of virtual machines to assign to a node may then be calculated by dividing the remaining load capacity of the node by the load demand value, and rounding down the resulting quotient to the nearest integer.

Consider, for example, that a load demand value of a virtual machine is 5, a first remaining load capacity of a first node is calculated as 100, and a second remaining load capacity of a second node is calculated as 300. In this example, a recommended number of VMs for the first node is 20 (e.g., first remaining load capacity of first node (100) divided by VM load demand value (5)=20); and a recommended number of VMs for the second node is 60 (e.g., second remaining load capacity of second node (300) divided by VM load demand value (5)=60)).

In a step 530, a node from the participating list is selected. In a step 535, a virtual machine from the set of virtual machines to restore is selected. In a step 540, the selected virtual machine is assigned to the selected node to restore. In a step 545, a determination is made as to whether each node has been assigned its respective number of virtual machines to restore or all virtual machines to restore have been assigned.

If each node has been assigned its respective number of VMs to restore or all VMs to restore have been assigned, the process proceeds to a step 555 where the nodes are instructed to begin restoring their assigned virtual machines. In an embodiment, once a virtual machine has been restored to a node, the backup application may instruct that the restored virtual machine be started.

If there remain additional virtual machines for restore that have yet to be assigned and at least some nodes have yet to be assigned their respective number of VMs to restore, the process loops back (550) to step 530 to continue the VM-to-node assignment process.

Consider, as an example, that a cluster includes first, second, and third nodes; there are 20 virtual machines (VM1-VM20) to restore; and, based on the current loadings of each node, the first node can support restoring 8 VMs, the second node can support restoring 3 VMs, and the third node can support restoring 14 VMs.

In a first pass of the assignment process, the first, second, and third nodes may be assigned VM1, VM2, and VM3, respectively. In a second pass, the first, second, and third nodes may be assigned VM4, VM5, and VM6, respectively. In a third pass, the first, second, and third nodes may be assigned VM7, VM8, and VM9, respectively. Thus, at the end of the third pass, the first node has been assigned a total of three VMs to restore (VM1, VM4, and VM7); the second node has been assigned a total of three VMs to restore (VM2, VM5, and VM8); and the third node has been assigned a total of three VMs to restore (VM3, VM6, and VM9).

In this example, the second node has reached the recommended number of VMs it should be assigned (e.g., 3). Thus, the remaining 11 VMs may be distributed to the first and third nodes.

For example, in a fourth pass, the first and third nodes may be assigned VM10 and VM11, respectively. The second node is skipped because it has already been assigned its maximum recommended number of VMs to restore. In a fifth pass, the first and third nodes may be assigned VM12 and VM13, respectively, and so forth. In an embodiment, once a node has been assigned its recommended number of VMs to restore, the node may be instructed to begin the restoration process while other nodes continue to be assigned VMs.

In some cases, the total number of virtual machines to restore may exceed the total recommended number of virtual machines the nodes are able to restore. The restore monitor monitors the restore processes. For example, the monitor may periodically poll the node for status updates, listen for status updates from the node, or both. When a node has completed its initial VM restoration assignments, the node may be assigned at least some of the remaining VMs to restore.

Figure 6:
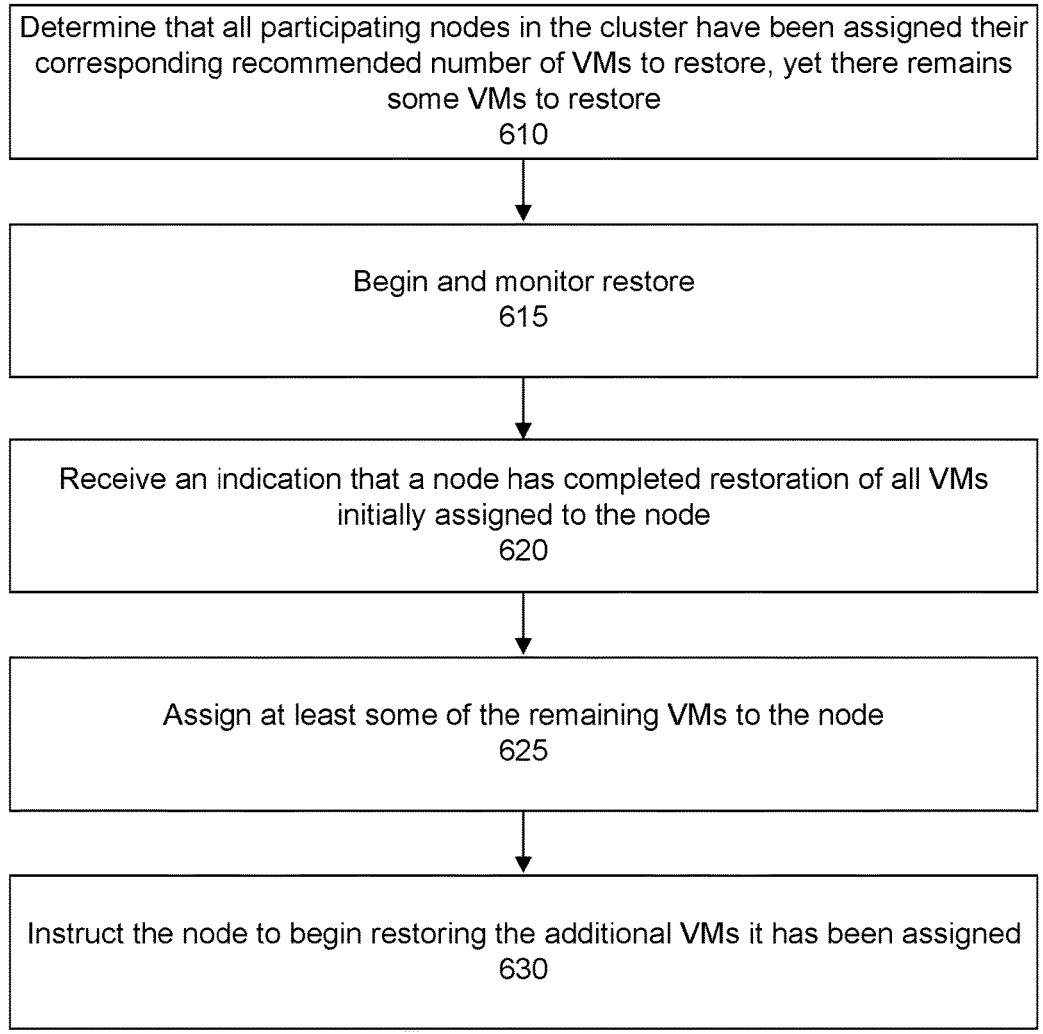
FIG. 6 shows another flow of a process for federated restores of virtual machines to a cluster, according to a specific embodiment.

For example, FIG. 6 shows a flow of process for assigning additional virtual machines to a node. In a step 610, a determination is made that all participating nodes have been assigned their corresponding number of virtual machines to restore, yet there remains some virtual machines to restore.

In a step 615, the system begins and monitors the restoration process.

In a step 620, an indication is received that a node has completed restoration of all virtual machines initially assigned to the node. For example, an agent at the node may monitor the restoration process of the virtual machines that have been assigned to the node. When the node has completed the restoration, the agent may transmit a message to the management server indicating that the restoration has completed. Instead or additionally, the management server may periodically poll the nodes for status updates on the restoration process.

In a step 625, the node is assigned at least some of the remaining virtual machines to restore. The assignment process may be similar to the process shown in FIG. 5 and described in the discussion accompanying FIG. 5.

In a step 630, the node is again instructed to begin restoring the additional virtual machines it has been assigned.

Figure 7:
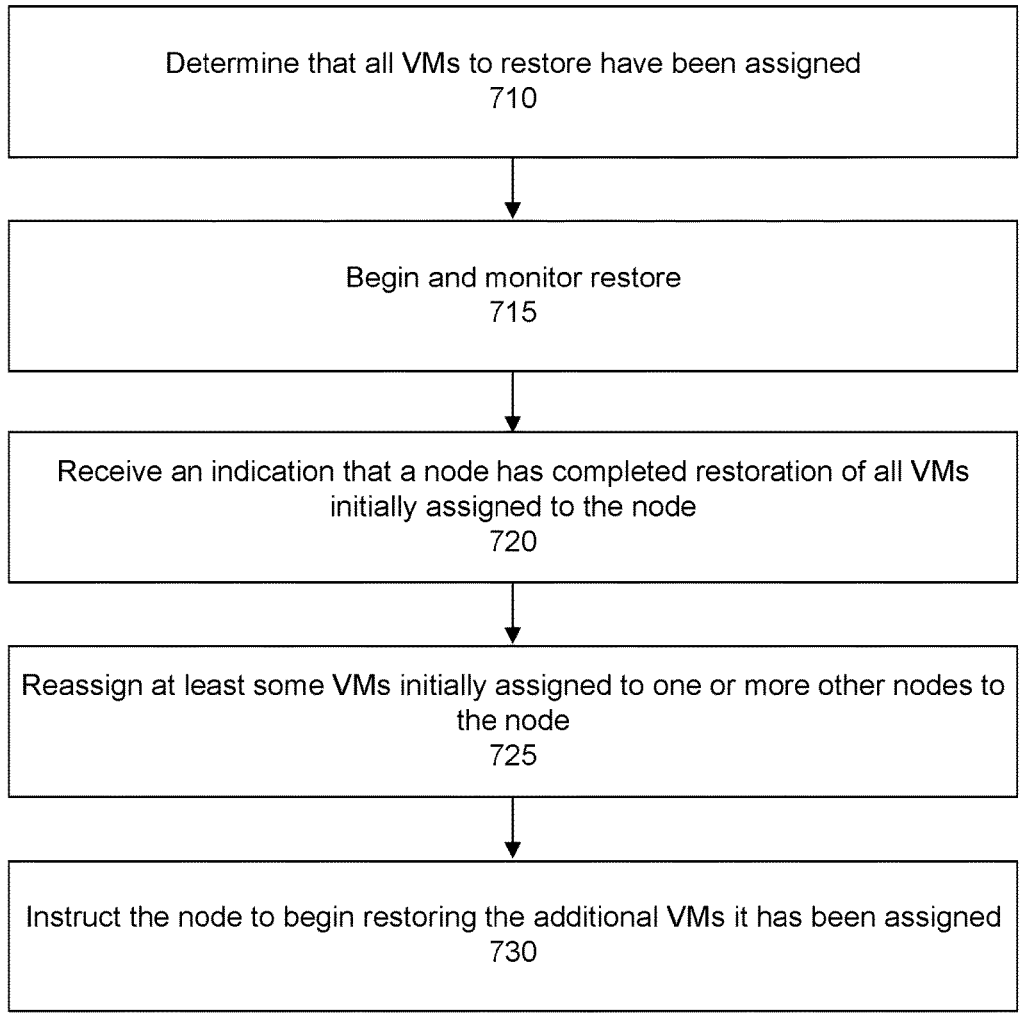
FIG. 7 shows another flow of a process for federated restores of virtual machines to a cluster, according to a specific embodiment.

FIG. 7 shows a flow of a process for redistributing the restoration load while virtual machine restorations are in progress. In a step 710, a determination is made that all virtual machines to restore have been assigned. In a step 715, the system begins and monitors the restoration process. In a step 720, an indication is received that a node has completed restoration of all virtual machines initially assigned to the node. In a step 725, at least some virtual machines assigned to one or more of the other nodes are reassigned to the node that has completed restoration of the virtual machines it was initially assigned. In a step 730, the node is again instructed to begin restoring the additional virtual machines it has been assigned.

Figure 8:
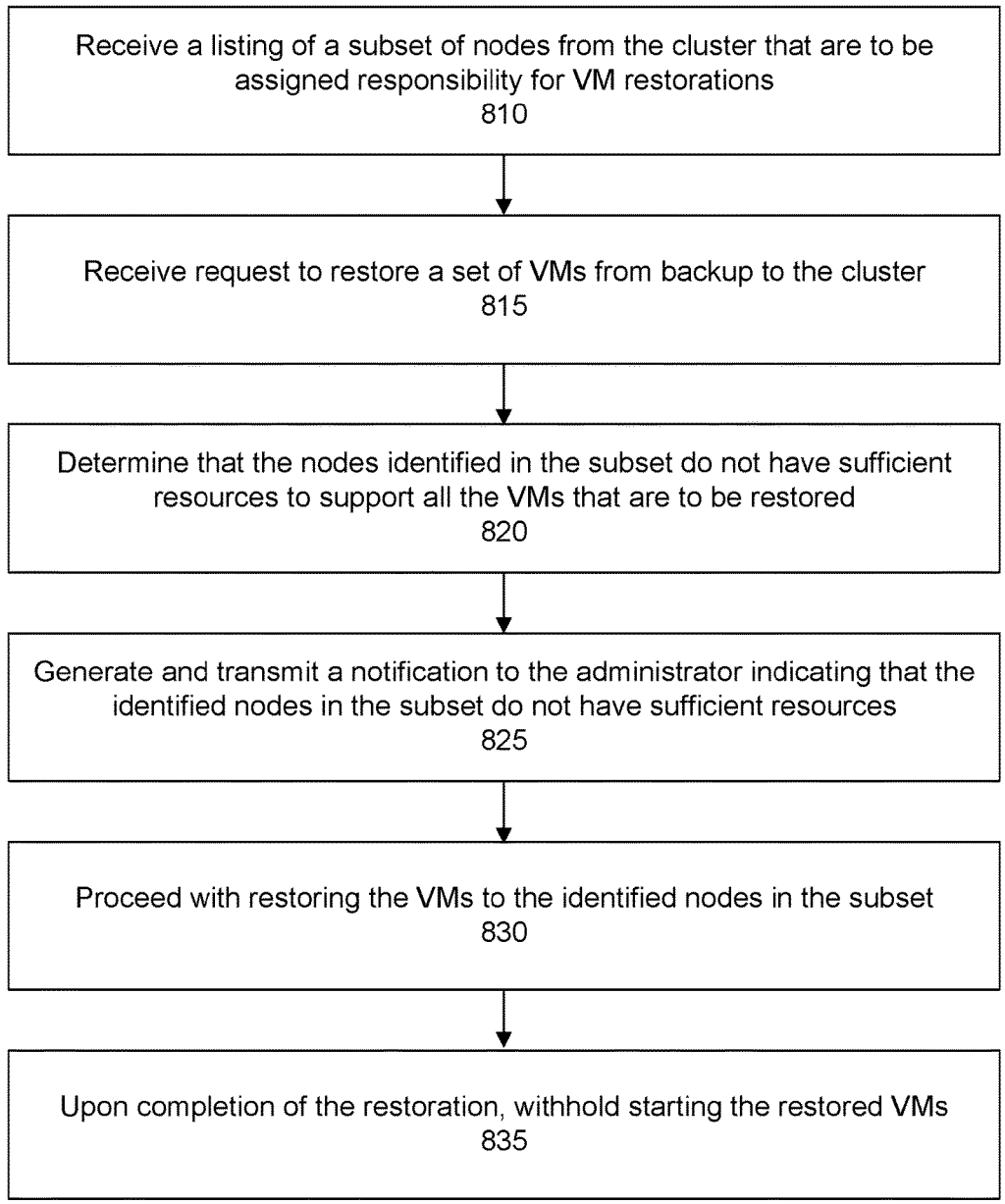
FIG. 8 shows another flow of a process for federated restores of virtual machines to a cluster, according to a specific embodiment.

FIG. 8 shows a flow of a process where an administrator has designated one or more specific nodes of a cluster as being responsible for virtual machine restorations, but the designated nodes have insufficient resources to support all the virtual machines that are to be restored. For example, the designated nodes may already be hosting a relatively large number of existing virtual machines, the nodes may not have been provisioned with a sufficient amount of memory, CPU, network, or combinations of these.

In a step 810, a listing of a subset of nodes from the cluster that are to be assigned restoration responsibility is received from the administrator.

In a step 815, a request is received to restore a set of virtual machines from backup to the cluster.

In a step 820, a determination is made that the nodes identified in the subset do not have sufficient resources to support all the virtual machines that are to be restored. The determination may be made by, for example, calculating the recommended number of VMs that each of the designated nodes are capable of supporting based on the current loadings of the nodes (see, e.g., step 525, FIG. 5); comparing the total recommended number of VMs to the total number of VMs to restore; and determining that the total number of VMs to restore is greater than the total recommended number of VMs.

In a step 825, a notification is generated to the user indicating that the nodes identified in the subset do not have sufficient resources to support all the virtual machines that are to be restored.

Nonetheless, in a step 830, the system proceeds with the restoration of the virtual machines to the nodes identified in the subset.

In a step 835, however, upon completion of the restoration, the system withholds starting the restored virtual machines. The withholding helps to ensure that the resources on the nodes do not become overloaded and potentially affect other existing virtual machines or services that may already be running on the node. The administrator may then take steps to address the lack of resources. For example, the administrator may move the restored or existing virtual machines to a different node, shut down some existing virtual machines so that resources can be diverted to the newly restored virtual machines, and so forth.

Figure 9:
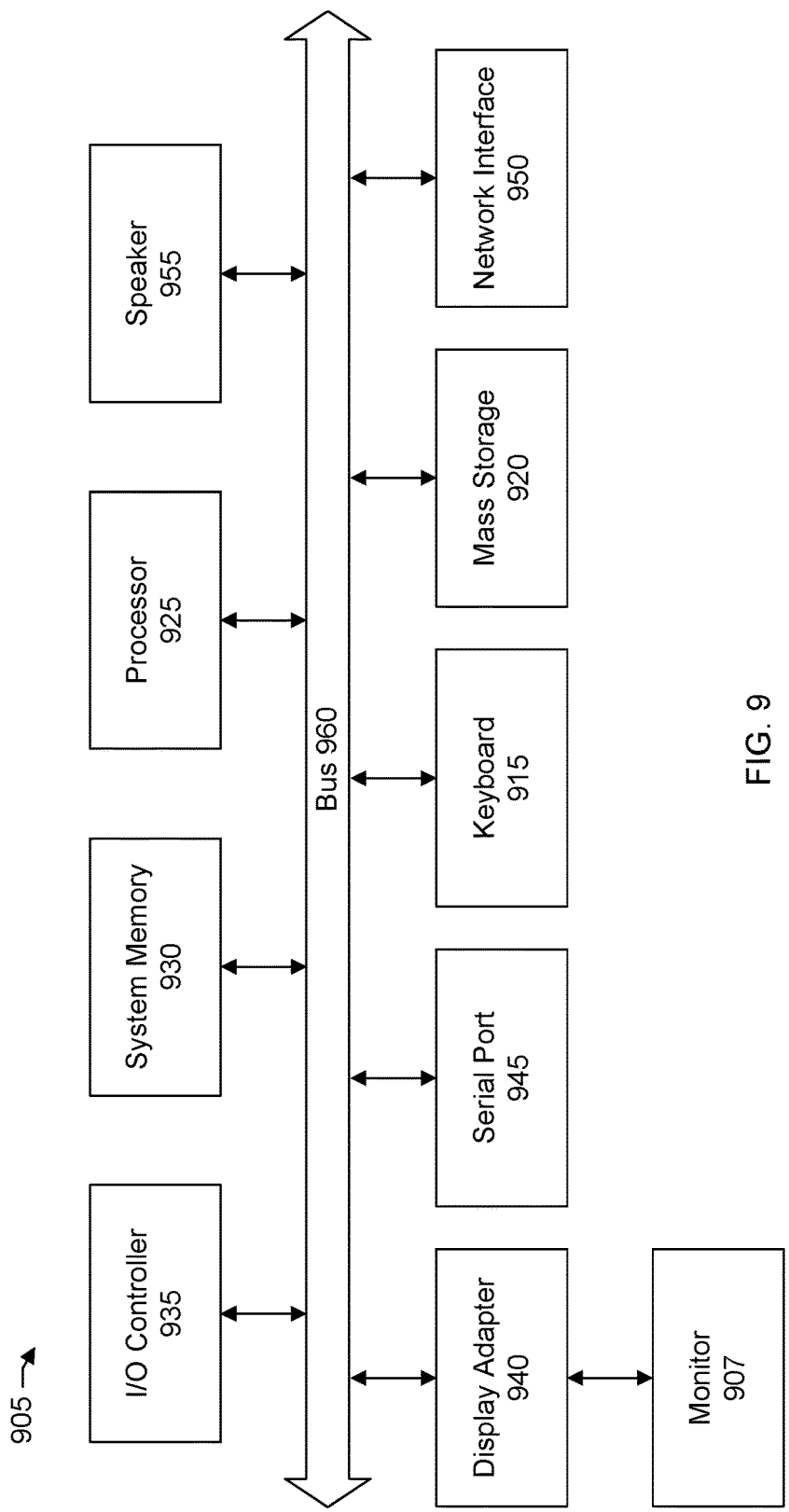
FIG. 9 shows a block diagram of a computer system that may be used to execute code and processes of the system, according to a specific embodiment.

FIG. 9 shows a system block diagram of a computer system 905 used to execute the software of the present system described herein. The computer system includes a monitor 907, keyboard 915, and mass storage devices 920. Computer system 905 further includes subsystems such as central processor 925, system memory 930, input/output (I/O) controller 935, display adapter 940, serial or universal serial bus (USB) port 945, network interface 950, and speaker 955. The system may also be used with computer systems with additional or fewer subsystems. For example, a computer system could include more than one processor 925 (i.e., a multiprocessor system) or a system may include a cache memory.

Arrows such as 960 represent the system bus architecture of computer system 905. However, these arrows are illustrative of any interconnection scheme serving to link the subsystems. For example, speaker 955 could be connected to the other subsystems through a port or have an internal direct connection to central processor 925. The processor may include multiple processors or a multicore processor, which may permit parallel processing of information. Computer system 905 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, a method includes receiving a request to restore a plurality of virtual machines (VMs) from backup to a cluster of nodes, each node comprising a plurality of resources for hosting one or more VMs; in response to the receiving a request, profiling the plurality of nodes to collect, for each node, a current load on the plurality of resources and a health status; generating a participating node list by excluding from the participating node list any node having a current load that exceeds a threshold or having a health status of unavailable; determining, for each node in the participating node list, a recommended number of VMs to assign for restore based on a particular current load of a corresponding particular node; selecting a node from the participating node list; selecting a VM from the plurality of VMs to restore; assigning the selected VM to the selected node to restore; repeating the selecting a node and VM, and assigning until each node in the participating node list has been assigned its respective recommended number of VMs to restore or all VMs from the plurality of VMs to restore have been assigned; and instructing the nodes in the participating node list to begin restoring their assigned VMs.

The current load may include memory usage, central processor unit (CPU) usage, and network usage. The determining, for each node in the participating node list, a recommended number of VMs to assign for restore based on a particular current load of a corresponding particular node may include: calculating a remaining load capacity of the particular node as a function of memory usage, central processor unit (CPU) usage, and network usage of the particular node; and calculating a particular recommended number of VMs to assign to the particular node as a function of the remaining load capacity of the particular node and a load demand of a VM, wherein memory usage is assigned a higher weighted value than CPU usage and network usage, and CPU usage is assigned a higher weighted value than network usage.

The method may include: receiving from a first node in the participating node list an indication that the first node has completed restoration of VMs assigned to the first node; and redistributing at least a subset of VMs initially assigned to a second node in the participating node list to restore to the first node to restore.

In an embodiment, a subset of nodes from the plurality of nodes to restore remain unassigned because each node in the participating node list has been assigned its respective recommended number of VMs to restore and the method includes: receiving from a first node in the participating node list an indication that the first node has completed restoration of VMs initially assigned to the first node; and assigning to the first node at least some of the subset of nodes to restore. In an embodiment, nodes in the participating node list restore their assigned VMs in parallel with each other.

In another specific embodiment, there is a system for performing federated restores, the system comprising: a processor-based system executed on a computer system and configured to: receive a request to restore a plurality of virtual machines (VMs) from backup to a cluster of nodes, each node comprising a plurality of resources for hosting one or more VMs; in response to the request, profile the plurality of nodes to collect, for each node, a current load on the plurality of resources and a health status; generate a participating node list by excluding from the participating node list any node having a current load that exceeds a threshold or having a health status of unavailable; determine, for each node in the participating node list, a recommended number of VMs to assign for restore based on a particular current load of a corresponding particular node; select a node from the participating node list; select a VM from the plurality of VMs to restore; assign the selected VM to the selected node to restore; repeat the selection of a node and VM, and assignment until each node in the participating node list has been assigned its respective recommended number of VMs to restore or all VMs from the plurality of VMs to restore have been assigned; and instruct the nodes in the participating node list to begin restoring their assigned VMs.

In another specific embodiment, there is a computer program product, comprising a non-transitory computer-readable medium having a computer-readable program code embodied therein, the computer-readable program code adapted to be executed by one or more processors to implement a method including: receiving a request to restore a plurality of virtual machines (VMs) from backup to a cluster of nodes, each node comprising a plurality of resources for hosting one or more VMs; in response to the receiving a request, profiling the plurality of nodes to collect, for each node, a current load on the plurality of resources and a health status; generating a participating node list by excluding from the participating node list any node having a current load that exceeds a threshold or having a health status of unavailable; determining, for each node in the participating node list, a recommended number of VMs to assign for restore based on a particular current load of a corresponding particular node; selecting a node from the participating node list; selecting a VM from the plurality of VMs to restore; assigning the selected VM to the selected node to restore; repeating the selecting a node and VM, and assigning until each node in the participating node list has been assigned its respective recommended number of VMs to restore or all VMs from the plurality of VMs to restore have been assigned; and instructing the nodes in the participating node list to begin restoring their assigned VMs.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   receiving a request to restore a plurality of virtual machines (VMs) to a cluster of nodes, each node comprising a plurality of resources for hosting one or more VMs;
   profiling the cluster to collect, for each node, a current load on the plurality of resources and a health status;
   generating a participating node list by excluding from the list any node having a current load that exceeds a threshold or having a health status of unavailable;

determining, for each node in the list, a recommended number of VMs to assign for restore based on a particular current load of a corresponding particular node;

selecting a node from the participating node list and a VM from the plurality of VMs to restore;

assigning the selected VM to the selected node to restore;

repeating the selecting and assigning until each node in the list has been assigned its respective recommended number of VMs to restore or all VMs from the plurality of VMs to restore have been assigned; and instructing the nodes in the list to begin restoring their assigned VMs.

2. The method of claim 1 wherein the current load comprises memory usage, central processor unit (CPU) usage, and network usage.

3. The method of claim 1 wherein the determining, for each node in the list, a recommended number of VMs to assign for restore based on a particular current load of a corresponding particular node comprises:

calculating a remaining load capacity of the particular node as a function of memory usage, central processor unit (CPU) usage, and network usage of the particular node; and calculating a particular recommended number of VMs to assign to the particular node as a function of the remaining load capacity of the particular node and a load demand of a VM, wherein memory usage is assigned a higher weighted value than CPU usage and network usage, and CPU usage is assigned a higher weighted value than network usage.

4. The method of claim 1 comprising:

receiving from a first node in the participating node list an indication that the first node has completed restoration of VMs assigned to the first node; and redistributing at least a subset of VMs initially assigned to a second node in the participating node list to restore to the first node to restore.

5. The method of claim 1 wherein a subset of nodes from the plurality of nodes to restore remain unassigned because each node in the participating node list has been assigned its respective recommended number of VMs to restore and the method comprises:

receiving from a first node in the participating node list an indication that the first node has completed restoration of VMs initially assigned to the first node; and assigning to the first node at a least some of the subset of nodes to restore.

6. The method of claim 1 wherein nodes in the participating node list restore their assigned VMs in parallel with each other.

7. A system for performing federated restores, the system comprising:

a processor-based computer system configured to:

receive a request to restore a plurality of virtual machines (VMs) to a cluster of nodes, each node comprising a plurality of resources for hosting one or more VMs;

profile the cluster to collect, for each node, a current load on the plurality of resources and a health status;

generate a participating node list by excluding from the list any node having a current load that exceeds a threshold or having a health status of unavailable;

determine, for each node in the list, a recommended number of VMs to assign for restore based on a particular current load of a corresponding particular node;

select a node from the list and a VM from the plurality of VMs to restore;

assign the selected VM to the selected node to restore;

repeat the selection and assignment until each node in the list has been assigned its respective recommended number of VMs to restore or all VMs from the plurality of VMs to restore have been assigned; and instruct the nodes in the list to begin restoring their assigned VMs.

8. The system of claim 7 wherein the current load comprises memory usage, central processor unit (CPU) usage, and network usage.

9. The system of claim 7 wherein the processor-based computer system is configured to:

calculate a remaining load capacity of the particular node as a function of memory usage, central processor unit (CPU) usage, and network usage of the particular node; and calculate a particular recommended number of VMs to assign to the particular node as a function of the remaining load capacity of the particular node and a load demand of a VM, wherein memory usage is assigned a higher weighted value than CPU usage and network usage, and CPU usage is assigned a higher weighted value than network usage.

10. The system of claim 7 wherein the processor-based computer system is configured to:

receive from a first node in the participating node list an indication that the first node has completed restoration of VMs assigned to the first node; and redistribute at least a subset of VMs initially assigned to a second node in the participating node list to restore to the first node to restore.

11. The system of claim 7 wherein a subset of nodes from the plurality of nodes to restore remain unassigned because each node in the participating node list has been assigned its respective recommended number of VMs to restore and the processor-based computer system is configured to:

receive from a first node in the participating node list an indication that the first node has completed restoration of VMs initially assigned to the first node; and assign to the first node at a least some of the subset of nodes to restore.

12. The system of claim 7 wherein nodes in the participating node list restore their assigned VMs in parallel with each other.

13. A computer program product, comprising a non-transitory computer-readable medium having a computer-readable program code embodied therein, the computer-readable program code adapted to be executed by one or more processors to implement a method comprising:

receiving a request to restore a plurality of virtual machines (VMs) from backup to a cluster of nodes, each node comprising a plurality of resources for hosting one or more VMs;

profiling the cluster to collect, for each node, a current load on the plurality of resources and a health status;

generating a participating node list by excluding from the list any node having a current load that exceeds a threshold or having a health status of unavailable;

determining, for each node in the list, a recommended number of VMs to assign for restore based on a particular current load of a corresponding particular node;

selecting a node from the participating node list and a VM from the plurality of VMs to restore;

assigning the selected VM to the selected node to restore;

repeating the selecting and assigning until each node in the list has been assigned its respective recommended number of VMs to restore or all VMs from the plurality of VMs to restore have been assigned; and instructing the nodes in the list to begin restoring their assigned VMs.

14. The computer program product of claim 13 wherein the current load comprises memory usage, central processor unit (CPU) usage, and network usage.

15. The computer program product of claim 13 wherein the determining, for each node in the list, a recommended number of VMs to assign for restore based on a particular current load of a corresponding particular node comprises:

calculating a remaining load capacity of the particular node as a function of memory usage, central processor unit (CPU) usage, and network usage of the particular node; and calculating a particular recommended number of VMs to assign to the particular node as a function of the remaining load capacity of the particular node and a load demand of a VM, wherein memory usage is assigned a higher weighted value than CPU usage and network usage, and CPU usage is assigned a higher weighted value than network usage.

16. The computer program product of claim 13 wherein the method comprises:

receiving from a first node in the participating node list an indication that the first node has completed restoration of VMs assigned to the first node; and redistributing at least a subset of VMs initially assigned to a second node in the participating node list to restore to the first node to restore.

17. The computer program product of claim 13 wherein a subset of nodes from the plurality of nodes to restore remain unassigned because each node in the participating node list has been assigned its respective recommended number of VMs to restore and the method comprises:

receiving from a first node in the participating node list an indication that the first node has completed restoration of VMs initially assigned to the first node; and assigning to the first node at a least some of the subset of nodes to restore.

18. The computer program product of claim 13 wherein nodes in the participating node list restore their assigned VMs in parallel with each other.

* * * * *